(12) United States Patent
Bloom

(10) Patent No.: US 8,345,569 B2
(45) Date of Patent: Jan. 1, 2013

(54) MULTIPLE WATERMARKS FOR FIDELITY ASSESSMENT

(75) Inventor: Jeffrey A. Bloom, Princeton Junction, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 337 days.

(21) Appl. No.: 12/623,478

(22) Filed: Nov. 23, 2009

(65) Prior Publication Data

US 2011/0122778 A1    May 26, 2011

(51) Int. Cl.
  *H04N 1/40*   (2006.01)
(52) U.S. Cl. .................. 370/252; 382/100; 713/176
(58) Field of Classification Search .................. None
See application file for complete search history.

(56) References Cited

U.S. PATENT DOCUMENTS

| | | | |
|---|---|---|---|
| 5,319,735 A | | 6/1994 | Preuss et al. |
| 5,848,155 A | | 12/1998 | Cox |
| 6,157,330 A | | 12/2000 | Bruekers et al. |
| 6,507,299 B1 | | 1/2003 | Nuijten |
| 6,654,479 B1 | | 11/2003 | Liao et al. |
| 7,013,021 B2 | * | 3/2006 | Sharma et al. ............... 382/100 |
| 7,616,777 B2 | * | 11/2009 | Rodriguez et al. ........... 382/100 |
| 2002/0076084 A1 | | 6/2002 | Tian et al. |
| 2005/0105798 A1 | | 5/2005 | Nguyen et al. |
| 2007/0014428 A1 | | 1/2007 | Kountchev et al. |
| 2009/0199008 A1 | | 8/2009 | Horvatic et al. |
| 2009/0220070 A1 | | 9/2009 | Picard et al. |

FOREIGN PATENT DOCUMENTS

| | | |
|---|---|---|
| WO | WO 99/33266 | 7/1999 |
| WO | WO 02/085033 A2 | 10/2002 |

OTHER PUBLICATIONS

Chun-Shien Lu, Member, IEEE, Shih-Kun Huang, Chwen-Jye Sze, and Hong-Yuan Mark Liao, Member, IEEE, *Cocktail Watermarking for Digital Image Protection*, IEEE Transactions on Multimedia, vol, 2, No. 4, Dec. 2000, pp. 209-224, © 2000 IEEE.

Ingemar J. Cox, Matthew L. Miller, Jeffrey A. Bloom, Jessica Fridrich, and Ton Kalker, *Digital Watermarking and Steganography*, Second Edition, Amsterdam, Boston, Heidelberg, London, New York, Oxford, Paris, San Diego, San Francisco, Singapore, Sydney and Tokyo, Morgan Kaufmann Publishers is an imprint of Elsevier, pp. 115-117. © 2008.

(Continued)

*Primary Examiner* — Kibrom T Hailu
*Assistant Examiner* — Benjamin Lamont
(74) *Attorney, Agent, or Firm* — Weingarten, Schurgin, Gagnebin & Lebovici LLP

(57) ABSTRACT

A system and method of perceptual quality assessment for multimedia content in a communications network employing digital watermarking. A content preparer prepares content for quality assessment by embedding digital watermarks into the multimedia data, each watermark having a different level of robustness with respect to a specified type of potential degradation introduced during content transmission. A quality assessor provides an assessment of the quality of the transmitted content by attempting to detect the presence of at least one watermark, and calculating a quality assessment score based on the level(s) of robustness of the detected watermark(s) with respect to the specified type of potential degradation. The quality assessment score can be calculated based on the level of robustness of the least robust watermark whose presence was successfully detected by the quality assessor. The quality assessor generates an output indication of the transmitted content fidelity using any suitable type of output indication.

26 Claims, 6 Drawing Sheets

OTHER PUBLICATIONS

Chun-Shien Lu, Hong-Yuan Mark Liao, Shih-Kun Huang, and Chwen-Jye Sze, *Highly Robust Image Watermarking Using Complementary Modulations*, Institute of Information Science, Academia Sinica, Taipei, Taiwan, {lcs, liao} @iis.sinica.edu.tw, p. 1-18, To appear in $2^{nd}$ International Information Security Workshop, Malaysia, Nov. 6-7, 1999, Lecture Notes in Computer Science, Springer-Verlag.

Chun-Shien Lu, Hong-Yuan Mark Liao, Shih-Kun Huang, and Chwen-Jye Sze, *Cocktail Watermarking on Images*, Institute of Information Science, Academia Sinica, Taipei, Taiwan, {lcs, liao}@iis.sinica.edu.tw, pp. 1-15, To appear in $3^{rd}$ International Workshop on Information Hiding, Dresden, Germany, Sep. 29-Oct. 1, 1999; Lecture Notes in Computer Science, Springer-Verlag.

* cited by examiner

MULTIPLE WATERMARKS FOR FIDELITY ASSESSMENT

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of fidelity assessment for multimedia content in a communications network environment, and more specifically to systems and methods of perceptual quality assessment for multimedia content in a network environment that employ digital watermarking techniques.

BACKGROUND OF THE INVENTION

Digital watermarking techniques are known that may be employed in making perceptual quality of service (QoS) measurements on multimedia content in a communications network environment. For example, a known system for making perceptual QoS measurements on multimedia content in a network environment embeds reduced-reference information into the multimedia data in the form of a digital watermark. Such reduced-reference information is useful for performing in-service QoS measurements, and typically includes a limited number of characteristics of the original multimedia content such as its spectral components, variation of energy level, energy distribution in the frequency domain, and/or any other characteristic that may be sensitive to degradation during transmission of the content. Such in-service QoS measurements using reduced-reference information generally involve a comparison of the reduced-reference information obtained from the transmitted content to the reduced-reference information included in the original content to provide an objective quality metric indicating the perceived quality of the transmitted content, typically in the form of a predicted mean opinion score (MOS).

In the known system for making perceptual QoS measurements on multimedia content discussed above, a digital watermark carrying the reduced-reference information is embedded directly into the multimedia data. The multimedia content with the embedded digital watermark is then encoded, and the encoded content is transmitted over the communications network. Next, the transmitted content is received at a receiver where it is decoded. The digital watermark with the reduced-reference information is then detected and extracted from the decoded content, and a perceptual QoS measurement is performed on the transmitted content using the reduced-reference information obtained from the digital watermark.

One drawback of the above-described system for making perceptual QoS measurements on multimedia content is that the digital watermark in the multimedia data may or may not be detectable at the receiver, depending on how robust the digital watermark is to the degradation introduced during transmission of the content. For example, some digital watermark embedding techniques may produce an embedded digital watermark that is robust to limited types of degradation from sources such as image rotation, while other digital watermark embedding techniques may produce an embedded digital watermark that is robust to a broader range of degradation types from sources such as additive noise, low-pass filtering, compression and/or transmission losses, etc. If the types of degradation introduced during content transmission are such that the digital watermark embedded in the content is undetectable at the receiver, then no reduced-reference information would be available at the receiver for making perceptual QoS measurements on the transmitted content. Even if the digital watermark were detectable in the transmitted content, the reduce-reference information obtained from the detected digital watermark may be insufficient for accurately estimating the level of the degradation introduced during content transmission, thereby limiting the ability of the system to provide a useful assessment of the fidelity of the transmitted content.

Other known systems for making perceptual QoS measurements on multimedia content in a communications network environment include systems that use full-reference information and systems that use no reference information. Known perceptual QoS measurement systems that employ full-reference information typically compare the entire transmitted content to the original content to provide an objective quality metric indicating the perceived quality of the transmitted content. However, because not all of the original content is typically available at the receiver, such systems employing full-reference information are generally more suited for making out-of-service QoS measurements such as those performed in research and development settings. Known perceptual QoS measurement systems that employ no reference information generally have no access to any information about the original content, and therefore typically provide an indication of the perceived quality of the transmitted content using only the information obtained from the transmitted content. However, because such systems that use no reference information generally rely on individuals to perform subjective quality evaluations of the transmitted content, they can be inaccurate, and costly and time-consuming to implement. Moreover, like systems that use full-reference information, systems that use no reference information have traditionally been more suited for making out-of-service QoS measurements.

It would therefore be desirable to have improved systems and methods of perceptual quality assessment for multimedia content employing digital watermarking techniques that avoid one or more of the drawbacks of known systems for making perceptual QoS measurements on multimedia content.

BRIEF SUMMARY OF THE INVENTION

In accordance with the present application, systems and methods of perceptual quality assessment for multimedia content in a communications network environment are disclosed that employ digital watermarking techniques. The presently disclosed systems and methods of perceptual quality assessment for multimedia content in a network environment embed multiple digital watermarks into the data of the multimedia content prior to transmission to a receiver, and provide an assessment of the fidelity of the transmitted content based at least in part on whether or not one or more of the digital watermarks in the multimedia data are detectable at the receiver.

In accordance with one aspect, a system for providing perceptual quality assessment of multimedia content in a communications network environment includes a first component (the "content preparer") operative to prepare the multimedia content for perceptual quality assessment, and a second component (the "quality assessor") operative to provide an assessment of the perceptual quality of the multimedia content following transmission of the content over a communications channel. Each of the terms "perceptual quality" and "perceptual quality of service (QoS)" is referred to herein as "quality of experience" or "QoE". In accordance with one exemplary aspect, the content preparer can be configured to include a plurality of digital watermark embedders, in which each digital watermark embedder can embed one or more digital watermarks into the data of the multimedia content. Alternatively, the content preparer can be configured to include one digital watermark embedder that can embed multiple digital watermarks into the multimedia data. In accordance with another exemplary aspect, the content preparer can be configured to include a plurality of digital watermark generators capable of generating multiple digital watermarks, and a digital watermark embedder that can embed the multiple digital watermarks into the multimedia data. In accordance with each of these exemplary aspects, each digital watermark has a characteristic level of robustness with respect to at least one type of degradation that may be introduced during content transmission.

In accordance with a further exemplary aspect, the quality assessor can be configured to include one or more digital watermark detectors and a quality of experience (QoE) assessment module. Each of the digital watermark detectors is operative to detect the presence or absence of one or more of the multiple digital watermarks in the multimedia data following transmission of the content over the communications channel. The QoE assessment module is operative to calculate a quality assessment score based on whether the output(s) of the respective digital watermark detector(s) indicate the detection of the presence or absence of one or more of the digital watermarks in the data of the transmitted content.

In accordance with an exemplary mode of operation, the content preparer can be configured to prepare the multimedia content for QoE assessment by embedding a set of digital watermarks into the multimedia data, in which each digital watermark has a different level of robustness with respect to a specified type of degradation that may be introduced during content transmission. For example, the specified type of degradation may be due to additive noise or any other suitable source of potential degradation. In accordance with this exemplary mode of operation, the quality assessor can be configured to provide an assessment of the QoE of the transmitted multimedia content by attempting to detect the presence of all of the digital watermarks in the set, and then calculating the quality assessment score based on the level(s) of robustness of the detected digital watermark(s) with respect to the specified type of potential degradation. In accordance with one aspect, the quality assessment score can be calculated based on the level of robustness of the least robust watermark whose presence was successfully detected by the quality assessor. Alternatively, the quality assessor can be configured to provide an assessment of the QoE of the transmitted content by attempting to detect the presence of the digital watermarks, starting with the least robust watermark, and, if the presence of the least robust watermark cannot be detected, then continuing with the next least robust watermark, and so on, until the presence of one of the digital watermarks in the set is successfully detected. The quality assessment score can then be calculated based on the level of robustness of the digital watermark whose presence was first successfully detected by the quality assessor. It is noted that the digital watermarks may become progressively undetectable as the multimedia content degrades, in which case a different set of digital watermarks having higher levels of robustness with respect to the specified type of degradation may be employed.

In accordance with another exemplary mode of operation, the content preparer can be configured to prepare the multimedia content for QoE assessment by embedding more than one set of digital watermarks into the multimedia data, in which the digital watermarks in each set have different levels of robustness with respect to a specified type of degradation that may be introduced during content transmission. For example, the content preparer may embed a first set of digital watermarks into the multimedia data having different levels of robustness with respect to additive noise or any other suitable source of potential degradation, and further embed a second set of digital watermarks into the multimedia data having different levels of robustness with respect to low-pass filtering or any other suitable source of potential degradation other than additive noise. In accordance with this exemplary mode of operation, the quality assessor can be configured to provide an assessment of the QoE of the transmitted content by attempting to detect the presence of all of the digital watermarks in each of the first and second sets, and then calculating the quality assessment score based on the level of robustness of the least robust watermark in each set whose presence was successfully detected by the quality assessor. Alternatively, the quality assessor can be configured to provide an assessment of the QoE of the transmitted content by attempting to detect the presence of the digital watermarks in each set, starting with the least robust watermark in the respective set, and, if the presence of the least robust watermark cannot be detected, then continuing with the next least robust watermark in the respective set, and so on, until the presence of one of the digital watermarks in the respective set is successfully detected. The quality assessment score can then be calculated based on the level of robustness of the digital watermark in each set whose presence was first successfully detected by the quality assessor. It is noted that the digital watermarks may become progressively undetectable as the multimedia content degrades, in which case different sets of digital watermarks having higher levels of robustness with respect to the specified types of degradation may be employed.

By embedding one or more sets of digital watermarks into the data of multimedia content, each set including multiple digital watermarks having different levels of robustness with respect to a specified type of degradation that may be introduced during content transmission, and calculating a quality assessment score based at least in part on whether the presence or absence of one or more of the digital watermarks in each set is detected in the transmitted content, an in-service assessment of the fidelity of the transmitted content can be obtained with increased speed, increased accuracy, and reduced cost.

Other features, functions, and aspects of the invention will be evident from the Drawings and/or the Detailed Description of the Invention that follow.

BRIEF DESCRIPTION OF THE SEVERAL
VIEWS OF THE DRAWINGS

The invention will be more fully understood with reference to the following Detailed Description of the Invention in conjunction with the drawings of which:

FIG. 1 is a block diagram of a system for perceptual quality assessment of multimedia content in a communications network environment, including a content preparer for preparing the multimedia content for perceptual quality assessment, and a quality assessor for providing an assessment of the perceptual quality of the multimedia content following transmission of the content over a communications channel;

Figure 1:
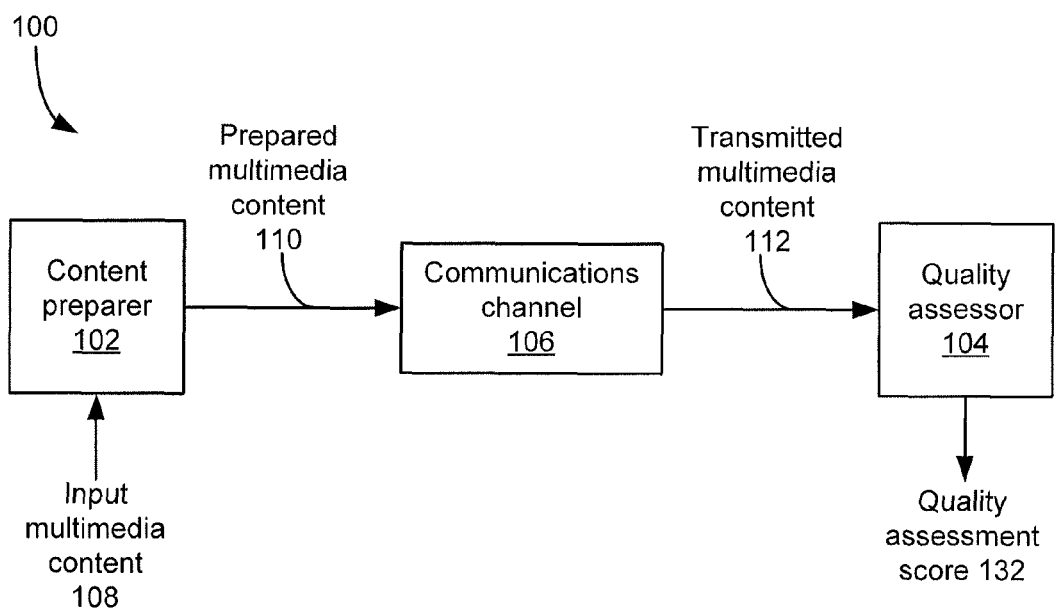
Figure 4:
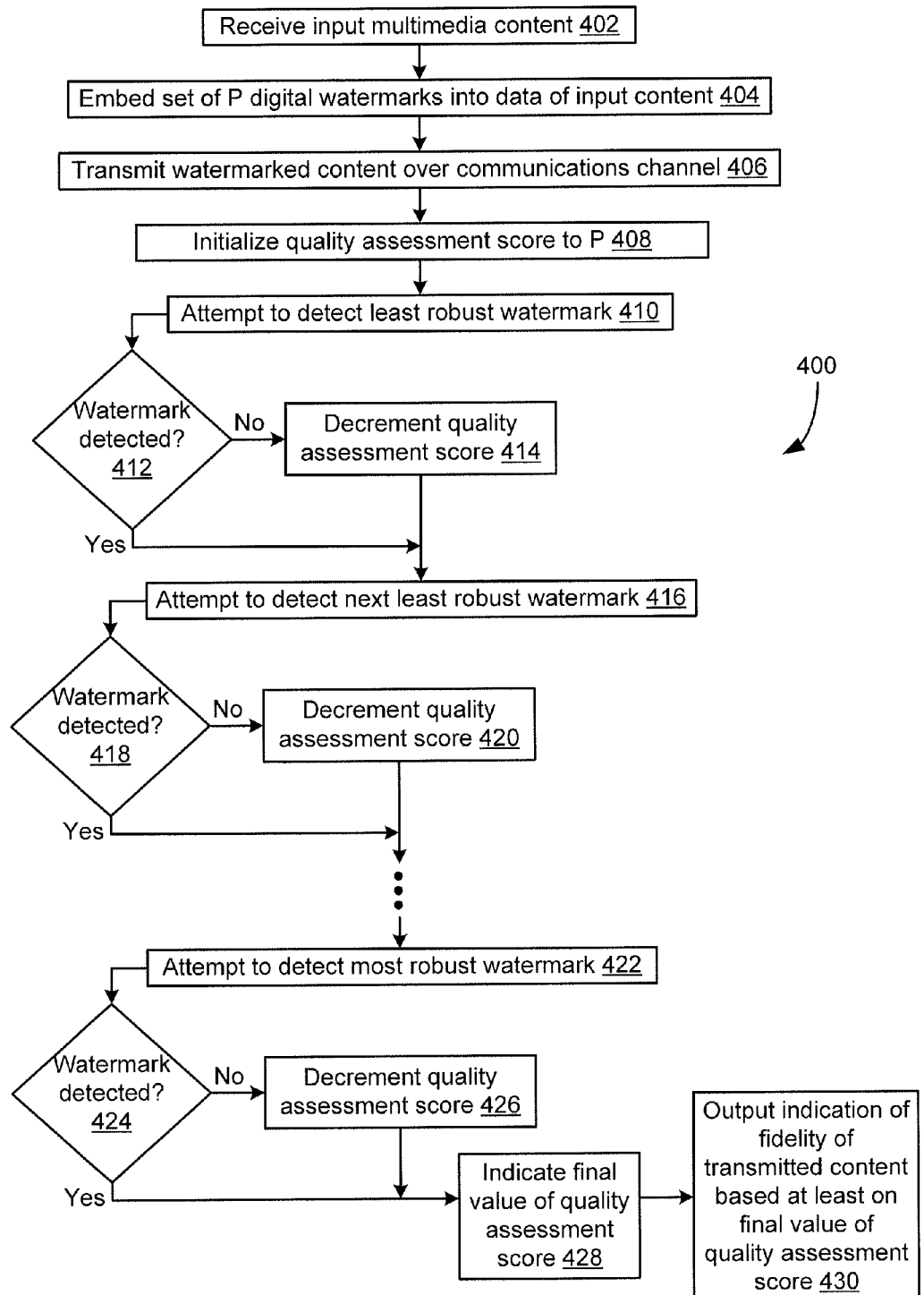
Figure 5:
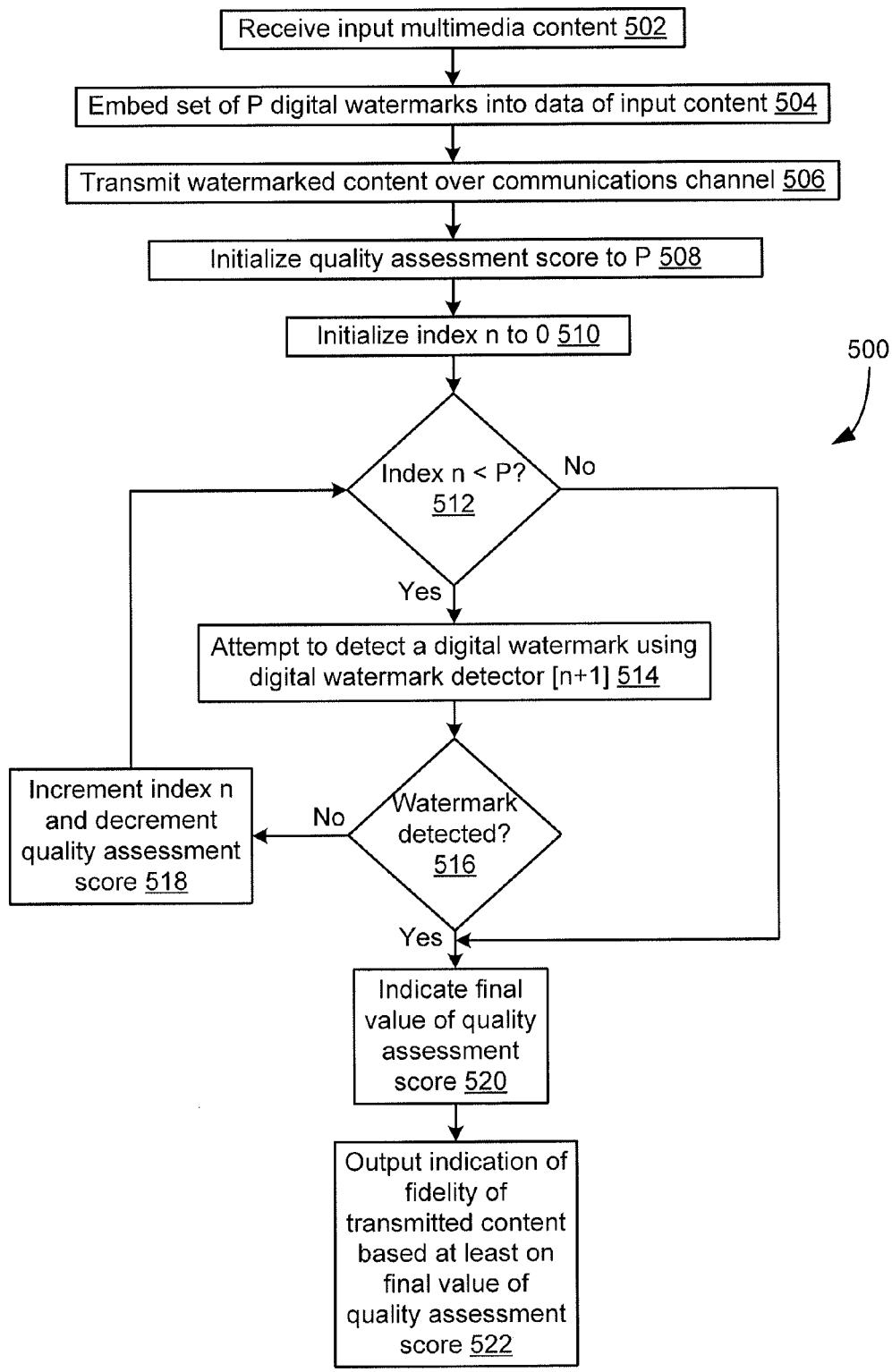

FIG. 4 is a flow diagram of an exemplary method of calculating a quality assessment score for providing an assessment of the perceptual quality of multimedia content following transmission of the content over the communications channel of FIG. 1; and FIG. 5 is a flow diagram of another exemplary method of calculating a quality assessment score for providing an assessment of the perceptual quality of multimedia content following transmission of the content over the communications channel of FIG. 1.

DETAILED DESCRIPTION OF THE INVENTION

Systems and methods of perceptual quality assessment for multimedia content in a communications network environment are disclosed that employ digital watermarking techniques. The presently disclosed systems and methods of perceptual quality assessment for multimedia content in a network environment embed multiple digital watermarks into the data of the multimedia content prior to transmission of the content to a receiver, and provide an assessment of the fidelity of the transmitted content based on whether or not one or more of the digital watermarks in the multimedia data are detectable at the receiver. By embedding at least one set of digital watermarks into the multimedia data prior to content transmission, each set including multiple digital watermarks having different levels of robustness with respect to at least one type of degradation that may be introduced during content transmission, and by calculating a quality assessment score based on whether the presence or absence of at least one digital watermark in each set was detected in the transmitted content, an in-service assessment of the fidelity of the transmitted content can be obtained with increased speed, increased accuracy, and reduced cost.

FIG. 1 depicts an illustrative embodiment of a system 100 for perceptual quality assessment of multimedia content in a communications network environment, in accordance with the present application. Each of the terms "perceptual quality" and "perceptual quality of service (QoS)" is referred to herein as "quality of experience" or "QoE". In accordance with the illustrated embodiment, the system 100 includes a first component 102 (referred to herein as the "content preparer") operative to prepare input multimedia content 108 for quality of experience (QoE) assessment, and to transmit prepared multimedia content 110 over a communications channel 106, which, for example, can be wire-based, optical fiber-based, wireless, or any suitable combination thereof. The system 100 further includes a second component 104 (referred to herein as the "quality assessor") operative to provide an assessment of the QoE of transmitted multimedia content 112 following transmission of the content 108 over the channel 106. For example, the input multimedia content 108 may be motion picture content (e.g., movies) or television content (e.g., video) that includes one or more motion image sequences. As employed herein, the term "motion image sequence" refers to an image sequence illustrating a person or an object moving in a background field of view. Alternatively, the input multimedia content 108 may include text, graphics, audio, data, animation, movies, video (television video, music video, performance video, webcam video, surveillance video, security video, unmanned aerial vehicle (UAV) video, teleconferencing video, and the like, etc.), or any suitable combination of text, graphics, audio, data, animation, movies, and/or video. Moreover, one or more types of degradation may be introduced into the data of the prepared multimedia content 110 during transmission of the content 108 over the channel 106 due to image rotation, additive noise, low-pass filtering, compression and/or transmission losses, etc. In further accordance with the illustrated embodiment, the content preparer 102 is operative to embed one or more digital watermarks into the data of the input content 108, and the quality assessor 104 is operative to calculate a quality assessment score 132 based on the detection of the presence or absence of at least one of the digital watermarks in the transmitted content 112, which corresponds to the prepared ("watermarked") content 110 after it has been subjected to one or more types of potential degradation during content transmission.

Figure 2A:
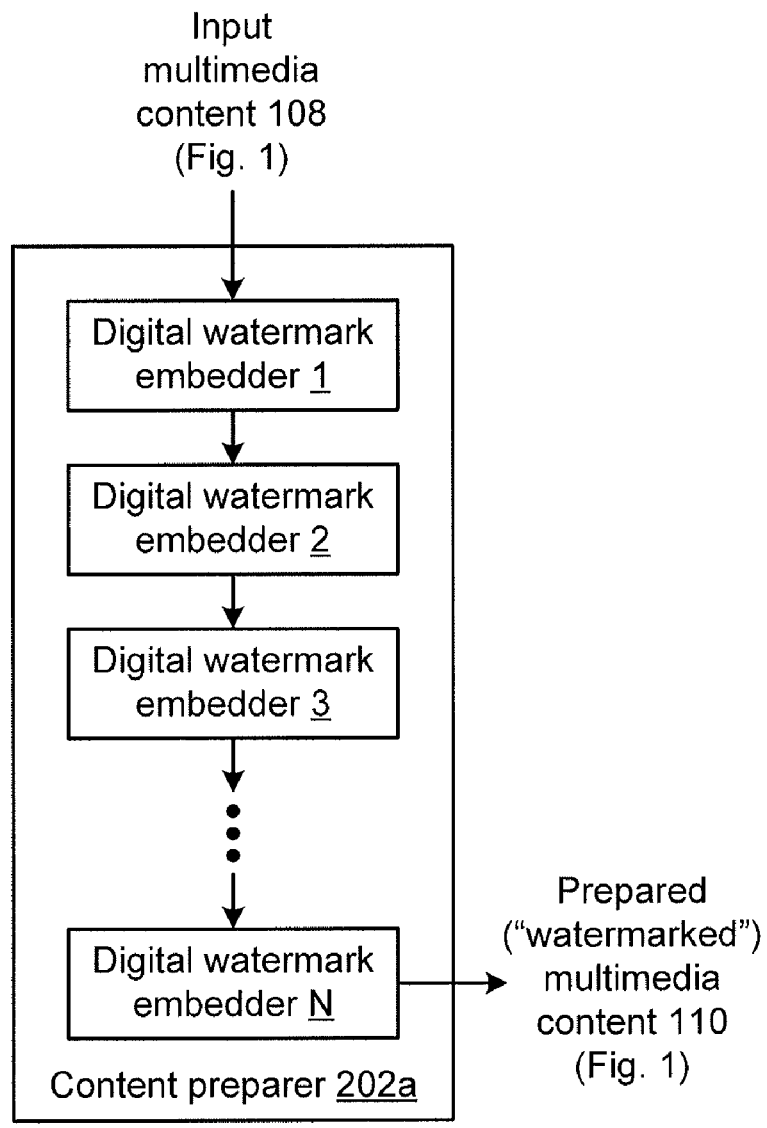
FIG. 2a is a block diagram illustrating the content preparer of FIG. 1 according to an exemplary embodiment of the present application.

FIG. 2a depicts an illustrative embodiment 202a of the content preparer, which is depicted via reference numeral 102 in the system 100 of FIG. 1. As shown in FIG. 2a, the content preparer 202a includes one or more digital watermark embedders 1, 2, 3, . . . N (where N≧1). Each of the digital watermark embedders 1, 2, 3, . . . N of FIG. 2a is operative to embed one or more digital watermarks into the data of the input multimedia content 108 (see FIG. 1). As employed herein, the term "digital watermarking" refers to any suitable process of introducing modifications into the data of the input content 108 such that the modified data (referred to herein as the "digital watermark") does not degrade the QoE of the watermarked content 110. For example, if the input content 108 includes a motion image sequence, then the content preparer 202a may embed a digital watermark into the data of the image sequence by modifying the color of some of the image pixels, thereby forming a statistical pattern in the image sequence that may be detected by the quality assessor 104. Each of the digital watermark embedders 1, 2, 3 . . . N is operative to embed one or more digital watermarks into the data of the input content 108 using any suitable known process of digital watermarking such as the processes described in U.S. Pat. No. 5,319,735 issued Jun. 7, 1994 entitled EMBEDDED SIGNALLING, U.S. Pat. No. 5,848,155 issued Dec. 8, 1998 entitled SPREAD SPECTRUM WATERMARK FOR EMBEDDED SIGNALLING, and U.S. Pat. No. 6,654,479 issued Nov. 25, 2003 entitled COCKTAIL WATERMARKING ON IMAGES, each of which is incorporated herein by reference. In accordance with the illustrated embodiment of FIG. 2a, each digital watermark embedded into the data of the input content 108 is referred to herein as a "zero-bit watermark" because it carries no information. Moreover, each digital watermark embedded into the multimedia data has a characteristic level of robustness with respect to at least one specified type of degradation that may be introduced during transmission of the watermarked content 110 such that the presence of a digital watermark with a sufficiently high level of robustness with respect to that specified type of degradation can be reliably detected in the transmitted content 112 (see FIG. 1).

Figure 2B:
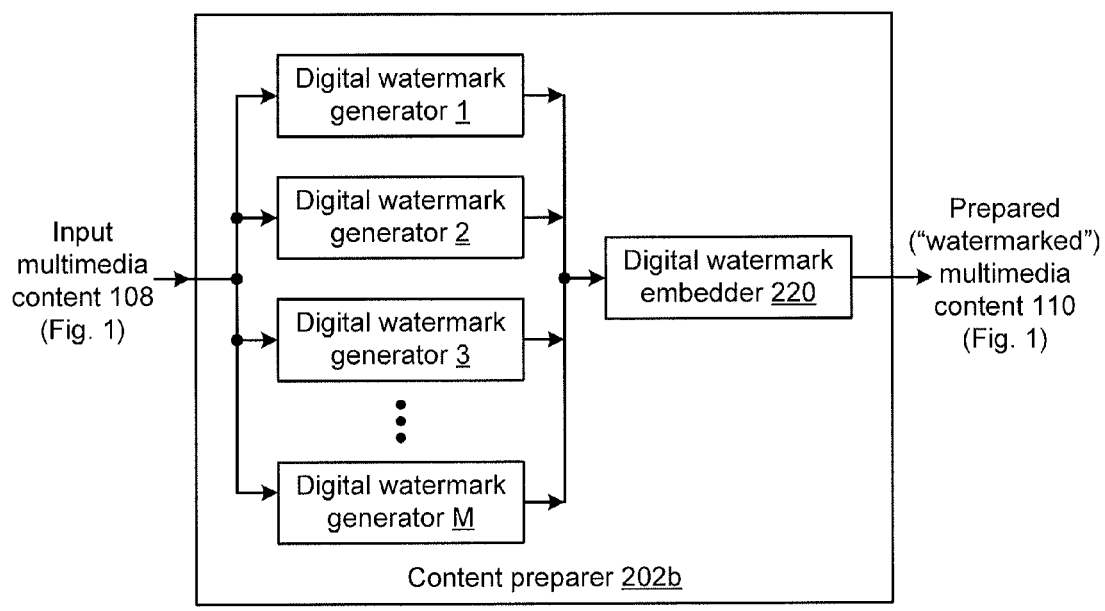
FIG. 2b is a block diagram illustrating the content preparer of FIG. 1 according to another exemplary embodiment of the present application.

FIG. 2b depicts another illustrative embodiment 202b of the content preparer, which is depicted via reference numeral 102 in the system 100 of FIG. 1. As shown in FIG. 2b, the content preparer 202b includes one or more digital watermark generators 1, 2, 3, . . . M (M≧1) and a digital watermark embedder 220. Each of the digital watermark generators 1, 2, 3 . . . M is operative to generate one or more digital watermarks based at least in part on the data of the input multimedia content 108 using any suitable known process of generating a digital watermark such as the process described in DIGITAL WATERMARKING AND STEGANOGRAPHY, 2nd Edition, Ingemar J. Cox, Matthew L. Miller, Jeffrey A. Bloom, Jessica Fridrich, and Ton Kalker, pages 115-117, Elsevier Inc., 2008, which is incorporated herein by reference. The digital watermark embedder 220 is operative to embed the multiple digital watermarks generated by the respective digital watermark generators 1, 2, 3 . . . M into the data of the input content 108. In the accordance with illustrated embodiment 202b, the digital watermark generators 1, 2, 3 . . . M are operative to generate a plurality of different digital watermarks substantially in parallel, each of the different digital watermarks having a characteristic level of robustness with respect to at least one specified type of degradation that may be introduced during transmission of the watermarked content 110. Moreover, the multiple digital watermarks generated by the digital watermark generators 1, 2, 3 . . . M are independent of one another such that the robustness of any one of the generated digital watermarks is not substantially affected by the generation of any other one of the digital watermarks.

Figure 3:
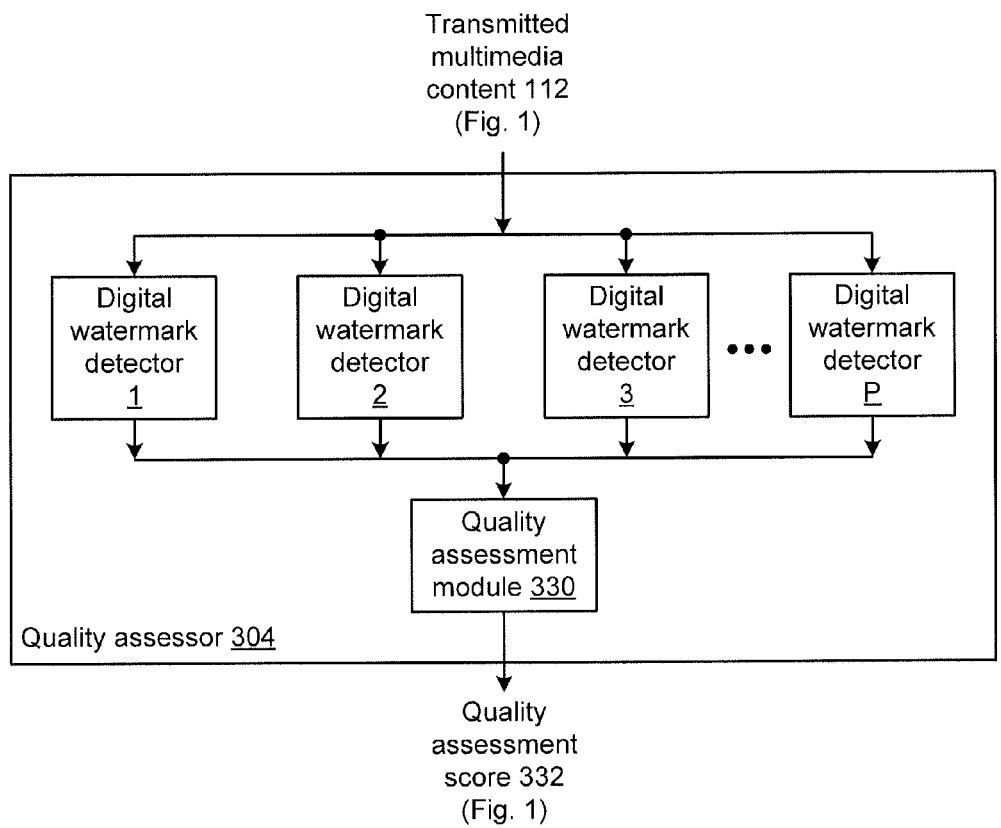
FIG. 3 is a block diagram illustrating the quality assessor of FIG. 1 according to an exemplary embodiment of the present application.

FIG. 3 depicts an illustrative embodiment 304 of the quality assessor, which is depicted via reference numeral 104 in the system 100 of FIG. 1. As shown in FIG. 3, the quality assessor 304 includes one or more digital watermark detectors 1, 2, 3 . . . P (P≧1) and a quality of experience (QoE) assessment module 330. Each of the digital watermark detectors 1, 2, 3 . . . P is operative to detect the presence or absence of one or more of the multiple digital watermarks in the transmitted content 112 (see FIG. 1) using any suitable known process of detecting a digital watermark such as the processes described in the previously cited U.S. Pat. No. 5,319,735, U.S. Pat. No. 5,848,155, and U.S. Pat. No. 6,654,479. The quality assessment module 330 is operative to calculate a quality assessment score 332 based on whether the outputs of the respective digital watermark detectors 1, 2, 3 . . . P indicate the detection of the presence or absence of one or more of the digital watermarks in the data of the transmitted content 112, or based on certainty-value outputs from the respective digital watermark detectors 1, 2, 3 . . . P.

In accordance with the illustrated embodiment 304, the one or more digital watermark detectors 1, 2, 3 . . . P of FIG. 3 are operative to detect the presence or absence of the multiple digital watermarks in the transmitted content 112 substantially in parallel. In accordance with one embodiment, each of the respective digital watermark detectors 1, 2, 3 . . . P can be configured to generate at least one binary-value output indicating the detection of the presence or absence of at least one corresponding digital watermark in the data of the transmitted content 112. In accordance with another embodiment, each digital watermark detector 1, 2, 3 . . . P can be configured to generate at least one continuous certainty-value output having a specified range indicating the likelihood of detection of the presence of at least one corresponding digital watermark in the data of the transmitted content 112. For example, each digital watermark detector 1, 2, 3 . . . P can be configured to generate a continuous certainty-value output, and the quality assessment module 330 can be configured to compare the respective certainty-value output to a predetermined threshold within the specified range to determine the presence or absence of the corresponding digital watermark in the transmitted multimedia data. The digital watermark detectors 1, 2, 3 . . . P can also be configured to generate continuous certainty-value outputs with specified ranges for a set of digital watermarks having different levels of robustness with respect to a specified type of degradation of the transmitted content 112, and the quality assessment module 330 can be configured to calculate the quality assessment score 332 based on some or all of the certainty-value outputs for the set of digital watermarks, or based on any suitable combination, function, or formula involving some or all of the certainty-value outputs. For example, the quality assessment module 330 may be configured to calculate the quality assessment score 332 based on a sum of the certainty-value outputs for the set of digital watermarks. In accordance with still another embodiment, each digital watermark detector 1, 2, 3 . . . P can be configured to generate at least one binary-value output and at least one continuous certainty-value output to indicate the presence or absence of at least one corresponding digital watermark in the transmitted multimedia data, and the quality assessment module 330 can be configured to calculate the quality assessment score 332 based on some or all of the binary-value and certainty-value outputs, or based on any suitable combination, function, or formula involving some or all of the binary-value and certainty-value outputs.

In accordance with one mode of operation, the content preparer 102 (see FIG. 1) can be configured to embed a set of digital watermarks into the data of the input multimedia content 108, in which each digital watermark has a different level of robustness with respect to a specified type of degradation that may be introduced during transmission of the content over the communications channel 106. For example, the specified type of degradation may be due to additive noise or any other suitable source of potential degradation. In accordance with this exemplary mode of operation, the quality assessor 104 can be configured to provide an assessment of the QoE of the transmitted content 112 by attempting to detect the presence of all of the digital watermarks in the set, and then calculating the quality assessment score 132 based on the level(s) of robustness of the detected digital watermark(s) with respect to the specified type of potential degradation. In accordance with one embodiment of this exemplary mode of operation, the quality assessment score 132 can be calculated based on the level of robustness of the least robust watermark in the set whose presence was successfully detected by the quality assessor 104. Alternatively, the quality assessor 104 can be configured to provide an assessment of the QoE of the transmitted content 112 by attempting to detect the presence of the digital watermarks, starting with the least robust watermark, and, if the presence of the least robust watermark cannot be detected, then continuing with the next least robust watermark, and so on, until the presence of one of the digital watermarks in the set is successfully detected. The quality assessment score 132 can then be calculated based on the level of robustness of the digital watermark whose presence was first successfully detected by the quality assessor 104. It is noted that the digital watermarks may become progressively undetectable as the multimedia content degrades, in which case a different set of digital watermarks having higher levels of robustness with respect to the specified type of degradation may be employed.

In accordance with another mode of operation, the content preparer 102 (see FIG. 1) can be configured to embed more than one set of digital watermarks into the data of the input multimedia content 108, wherein the digital watermarks in each set have different levels of robustness with respect to a specified type of degradation that may be introduced during transmission of the content over the communications channel 106. For example, the content preparer 102 may embed a first set of digital watermarks into the multimedia data having different levels of robustness with respect to additive noise or any other suitable source of potential degradation, and may further embed a second set of digital watermarks into the multimedia data having different levels of robustness with respect to low-pass filtering or any other suitable source of potential degradation other than additive noise. In accordance with this exemplary mode of operation, the quality assessor 104 can be configured to provide an assessment of the QoE of the transmitted content 112 by attempting to detect the presence of all of the digital watermarks in each of the first and second sets, and then calculating the quality assessment score 132 based on the level of robustness of the least robust watermark in each set whose presence was successfully detected by the quality assessor 104. Alternatively, the quality assessor 104 can be configured to provide an assessment of the QoE of the transmitted content 112 by attempting to detect the presence of the digital watermarks in each set, starting with the least robust watermark in the respective set, and, if the presence of the least robust watermark cannot be detected, then continuing with the next least robust watermark in the respective set, and so on, until the presence of one of the digital watermarks in the respective set is successfully detected. The quality assessor 104 can then calculate the quality assessment score 132 based on the level of robustness of the digital watermark in each set whose presence was first successfully detected by the quality assessor 104. It is noted that the digital watermarks may become progressively undetectable as the multimedia content degrades, in which case different sets of digital watermarks having higher levels of robustness with respect to the specified types of degradation may be employed.

A first illustrative method 400 of providing an assessment of the quality of experience (QoE) of multimedia content following transmission of the content over a communications channel is described below with reference to FIGS. 1, 3, and 4. This first illustrative method 400 (see FIG. 4) can be performed using the system 100 (see FIG. 1), and the illustrative embodiment 304 of the quality assessor depicted via reference numeral 104 in the system 100. In accordance with the method 400, the quality assessor 104 initializes the quality assessment score 132 to P, which corresponds to the number of digital watermark detectors included in the quality assessor 104. Using the P digital watermark detectors, the quality assessor 104 makes successive attempts to detect the presence of all of the digital watermarks embedded into the data of the transmitted content 112, starting with the least robust watermark, continuing with the next least robust watermark, and so on. With each unsuccessful attempt to detect one of the digital watermarks in the transmitted content 112, the quality assessor 104 decrements the quality assessment score 132, thereby providing an indication that the QoE of the transmitted content has decreased.

In accordance with the method 400 of FIG. 4, the content preparer 102 (see FIG. 1) receives input multimedia content 108, as depicted in step 402, and embeds a set of P digital watermarks into the data of the input content 108, as depicted in step 404, such that each digital watermark has a different level of robustness with respect to a specified type of degradation that may be introduced during transmission of the content over the communications channel 106. As depicted in step 406, the watermarked content 110 is transmitted over the channel 106, which provides the transmitted content 112 for receipt by the quality assessor 104 for QoE assessment. As depicted in step 408, the quality assessor 104 initializes the quality assessment score 132 to P, which corresponds to the number of digital watermark detectors within the quality assessor 104. In further accordance with the method 400, the P digital watermark detectors make successive attempts to detect the P digital watermarks embedded into the data of the input content 108, respectively, such that a first one of the P digital watermark detectors attempts to detect the least robust watermark, a second one of the P digital watermark detectors attempts to detect the next least robust watermark, and so on, until a final ($P^{th}$) one of the P digital watermark detectors attempts to detect the most robust watermark with respect to the specified type of potential degradation.

As depicted in step 410, the first one of the P digital watermark detectors attempts to detect the least robust watermark in the transmitted content 112. At step 412, a determination is made as to whether or not the first one of the P digital watermark detectors has successfully detected the presence of the least robust watermark in the transmitted content 112. If the first digital watermark detector has not successfully detected the presence of the least robust watermark in the transmitted content 112, then the quality assessor 104 decrements the quality assessment score 132 (--P) (see step 414), and the method 400 proceeds to step 416. Otherwise, if the first digital watermark detector has successfully detected the presence of the least robust watermark in the transmitted content 112, then the quality assessment score is not decremented, and the method 400 proceeds directly to step 416.

As depicted in step 416, the second one of the P digital watermark detectors attempts to detect the next least robust watermark in the transmitted content 112. At step 418, a determination is made as to whether or not the second one of the P digital watermark detectors has successfully detected the presence of the next least robust watermark in the transmitted content 112. If the second digital watermark detector has not successfully detected the presence of the next least robust watermark in the transmitted content 112, then the quality assessor 104 decrements the quality assessment score 132 (--(--P)) (see step 420), and the method 400 continues, ultimately proceeding to step 422. Otherwise, if the second digital watermark detector has successfully detected the presence of the next least robust watermark in the transmitted content 112, then the quality assessment score is not decremented, and the method 400 continues, ultimately proceeding to step 422.

As depicted in step 422, the final ($P^{th}$) one of the P digital watermark detectors attempts to detect the most robust watermark in the transmitted content 112. At step 424, a determination is made as to whether or not the final one of the P digital watermark detectors has successfully detected the presence of the most robust watermark in the transmitted content 112. If the final digital watermark detector has not successfully detected the presence of the most robust watermark in the transmitted content 112, then the quality assessor 104 decrements the quality assessment score 132 (see step 426), and the method 400 proceeds to step 428. Otherwise, if the final digital watermark detector has successfully detected the presence of the most robust watermark in the transmitted content 112, then the quality assessment score 132 is not decremented, and the method 400 proceeds directly to step 428.

Accordingly, in accordance with the method 400 of FIG. 4, if the quality assessor 104 (see FIG. 1) successfully detects all of the digital watermarks embedded into the data of the transmitted content 112, then the quality assessor 104 would indicate, at step 428, that the final value of the quality assessment score is P, which, in accordance with this exemplary method 400, is the highest possible score value. If the quality assessor 104 does not successfully detect a digital watermark in one of the steps 410, 416, 422, then the quality assessor 104 would indicate, at step 428, that the final value of the quality assessment score is --P, which, in accordance with this exemplary method 400, is the next highest possible score value. If the quality assessor 104 successfully detects only the most robust watermark in the transmitted content 112 at step 422, then the quality assessor 104 would indicate, at step 428, that the final value of the quality assessment score is one (1). If the quality assessor 104 cannot successfully detect any of the digital watermarks embedded in the transmitted content 112, then the quality assessor 104 would indicate, at step 428, that the final value of the quality assessment score is zero (0), which, in accordance with this exemplary method 400, is the lowest possible score value. Based at least in part on the final value of the quality assessment score, the quality assessor 104 then generates an output indication of the fidelity of the transmitted content, as depicted in step 430, such that an output indication of high fidelity corresponds to a high final value of the quality assessment score, and an output indication of low fidelity corresponds to a low final value of the quality assessment score.

A second illustrative method 500 of providing an assessment of the quality of experience (QoE) of multimedia content following transmission of the content over a communications channel is described below with reference to FIGS. 1 and 5. This second illustrative method 500 (see FIG. 5) can be performed using the system 100 (see FIG. 1), which includes the content preparer 102 and the quality assessor 104. In accordance with the method 500, the quality assessor 104 initializes the quality assessment score 132 to P, which corresponds to the number of digital watermark detectors included in the quality assessor 104. Using the P digital watermark detectors, the quality assessor 104 makes successive attempts to detect the presence of at least one of multiple digital watermarks embedded into the data of the transmitted content 112, starting with the least robust watermark, continuing with the next least robust watermark, and so on, until the presence of one of the digital watermarks in the transmitted content 112 is successfully detected. With each unsuccessful attempt to detect one of the digital watermarks in the transmitted content 112, the quality assessor 104 decrements the quality assessment score 132, thereby providing an indication that the QoE of the transmitted content has decreased.

In accordance with the illustrative method 500, the content preparer 102 receives input multimedia content 108, as depicted in step 502, and embeds a set of P digital watermarks into the data of the input content 108, as depicted in step 504, such that each digital watermark has a different level of robustness with respect to a specified type of degradation that may be introduced during transmission of the content over the communications channel 106. As depicted in step 506, the watermarked content 110 is transmitted over the channel 106, which provides the transmitted content 112 for receipt by the quality assessor 104 for QoE assessment. As depicted in step 508, the quality assessor 104 initializes the quality assessment score 132 to P, which corresponds to the number of digital watermark detectors within the quality assessor 104. In accordance with the method 500, the P digital watermark detectors make successive attempts to detect the P digital watermarks embedded into the data of the input content 108, respectively, such that a first one of the P digital watermark detectors attempts to detect the least robust watermark, and, if the first digital watermark detector cannot detect the least robust watermark, then a second one of the P digital watermark detectors attempts to detect the next least robust watermark, and so on. If the first digital watermark detector and the second digital watermark detector cannot detect the least robust watermark and the next least robust watermark, respectively, then ultimately a final ($P^{th}$) one of the P digital watermark detectors may attempt to detect the most robust watermark with respect to the specified type of potential degradation.

As depicted in step 510, the quality assessor 104 initializes an index n to 0 (n=0). As depicted in step 512, a determination is made as to whether or not the index n is less than P (n<P). If the index n is less than P, then, using the $[n+1]^{st}$ or first (n=0) one of the P digital watermark detectors within the quality assessor 104, an attempt is made to detect the presence of the least robust watermark in the transmitted content 112 (see step 514). At step 516, a determination is made as to whether or not the first one of the P digital watermark detectors has successfully detected the presence of the least robust watermark in the transmitted content 112. If the first digital watermark detector has not successfully detected the presence of the least robust watermark in the transmitted content 112, then the quality assessor 104 increments the index n (++n), and decrements the quality assessment score P (−−P) (see step 518), and the method 500 loops back to step 512, pursuant to which a determination is made as to whether or not the incremented index ++n is less than P.

If it is determined at step 512 that the incremented index ++n is not less than the number P, then the method 500 proceeds to step 520 where the quality assessor 104 provides an indication of the final value of the quality assessment score, which, in accordance with this exemplary method, corresponds to the value of the decremented number −−P. Otherwise, if the incremented index ++n is less than P, then the method proceeds to step 514 where the $[++n+1]^{nd}$ or second (++n=1) one of the P digital watermark detectors within the quality assessor 104 makes an attempt to detect the presence of the next least robust watermark in the transmitted content 112. At step 516, a determination is made as to whether or not the second one of the P digital watermark detectors has successfully detected the presence of the next least robust watermark in the transmitted content 112. If the second digital watermark detector has not successfully detected the presence of the next least robust watermark in the transmitted content 112, then the quality assessor 104 increments the index n (++(++n))), and decrements the quality assessment score P (−−(−−P))) (see step 518), and the method 500 loops back to step 512. If the second digital watermark detector has successfully detected the presence of the next least robust watermark in the transmitted content 112, then the method 500 proceeds to step 520 where the quality assessor 104 provides an indication of the final value of the quality assessment score, which, in accordance with this exemplary method, corresponds to the value of the decremented number −−P.

Accordingly, in accordance with the method 500, if the quality assessor 104 successfully detects the least robust watermark in the set of digital watermarks embedded in the transmitted content 112, then the quality assessor 104 would indicate, at step 520, that the final value of the quality assessment score is P, which, in accordance with this exemplary method, is the highest possible score value. If the quality assessor 104 does not successfully detect the least robust watermark in the transmitted content 112, but successfully detects the next least robust watermark, then the quality assessor 104 would indicate, at step 520, that the final value of the quality assessment score is −−P, which, in accordance with this exemplary method, is the next highest possible score value. If the quality assessor 104 successfully detects only the most robust watermark in the transmitted content 112, then the quality assessor 104 would indicate, at step 520, that the final value of the quality assessment score is one (1). If the quality assessor 104 cannot successfully detect any of the digital watermarks embedded in the transmitted content 112, then the quality assessor 104 would indicate, at step 520, that the final value of the quality assessment score is zero (0), which, in accordance with this exemplary method, is the lowest possible score value. Based at least in part on the final value of the quality assessment score, the quality assessor 104 then generates an output indication of the fidelity of the transmitted content, as depicted in step 522, such that an output indication of high fidelity corresponds to a high final value of the quality assessment score, and an output indication of low fidelity corresponds to a low final value of the quality assessment score. For example, in accordance with the method 400 of FIG. 4 and the method 500 of FIG. 5, the quality assessor 104 can be configured to generate a graphical output indication of the fidelity of the transmitted content in the form of a meter or any other suitable output indication.

Having described the above illustrative embodiments, other alternative embodiments are possible and/or variations to these illustrative embodiments may be made. For example, it was described that each digital watermark embedded into the data of the input multimedia content is a zero-bit watermark because it carries no information. In accordance with one or more alternative embodiments, one or more of the digital watermarks embedded into the multimedia data may be a multi-bit (or "n-bit") watermark that is capable of carrying n bits of information, which may be recovered by one of the digital watermark detectors included in the quality assessor of the presently disclosed system.

It will also be appreciated by those of ordinary skill in the art that one or more of the functions necessary to implement the above-described systems and methods of assessing the fidelity of multimedia content using multiple digital watermarks can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, wire-based, optical fiber-based, or wireless communications media or devices, and/or any other suitable hardware and/or software components and/or devices.

It will be further appreciated by those skilled in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of assessing the perceptual quality of multimedia content provided over a communications channel, comprising the steps of:
   incorporating a plurality of digital watermarks in the multimedia content;
   transmitting the multimedia content including the plurality of digital watermarks over the communications channel, the plurality of digital watermarks having different levels of robustness with respect to a specified type of degradation in the perceptual quality of the multimedia content introducible during multimedia content transmission;
   in a detecting step, detecting at least one of the plurality of digital watermarks in the multimedia content, wherein the detecting step is performed starting with a least robust digital watermark among the plurality of digital watermarks, and, in the event the least robust digital watermark is not detected, continuing with at least one next least robust digital watermark among the plurality of digital watermarks until the at least one of the plurality of digital watermarks is detected; and
   in response to having detected the at least one of the plurality of digital watermarks in the multimedia content, generating an output indicative of at least the perceptual quality of the multimedia content based at least in part on the respective level of robustness of the at least one detected digital watermark.

2. The method of claim 1 wherein the at least one detected digital watermark has a lowest level of robustness with respect to the specified type of potential degradation, and wherein the generating of the output includes generating the output indicative of at least the perceptual quality of the multimedia content based at least in part on the lowest level of robustness of the at least one detected digital watermark.

3. The method of claim 2 further comprising:
   calculating a quality assessment score based at least in part on the lowest level of robustness of the at least one detected digital watermark, and wherein the generating of the output includes generating the output indicative of at least the perceptual quality of the multimedia content based on the quality assessment score.

4. The method of claim 2 wherein the detecting of the at least one of the plurality of digital watermarks includes making multiple attempts to detect the digital watermarks in the multimedia content, and no longer making the multiple attempts to detect the digital watermarks if the at least one detected digital watermark having the lowest level of robustness is detected.

5. The method of claim 1 wherein the detecting of the at least one of the plurality of digital watermarks includes attempting to detect each of the plurality of digital watermarks in the multimedia content.

6. The method of claim 1 wherein the incorporating of the plurality of digital watermarks in the multimedia content includes incorporating a first plurality of digital watermarks in the multimedia content and incorporating a second plurality of digital watermarks in the multimedia content, first plurality of digital watermarks having different levels of robustness with respect to a specified first type of degradation in the perceptual quality of the multimedia content introducible during multimedia content transmission, and the second plurality of digital watermarks having different levels of robustness with respect to a specified second type of degradation in the perceptual quality of the multimedia content introducible during multimedia content transmission.

7. The method of claim 6 wherein the detecting of the at least one of the plurality of digital watermarks includes detecting at least one of the first plurality of digital watermarks in the multimedia content, and detecting at least one of the second plurality of digital watermarks in the multimedia content.

8. The method of claim 7 wherein a first one of the at least one detected digital watermark from the first plurality of digital watermarks has a lowest level of robustness with respect to the specified first type of potential degradation, wherein a second one of the at least one detected digital watermark from the second plurality of digital watermarks has a lowest level of robustness with respect to the specified second type of potential degradation, and wherein the generating of the output includes generating the output indicative of at least the perceptual quality of the multimedia content based at least in part on one or more of the lowest level of robustness of the first one of the at least one detected digital watermark from the first plurality of digital watermarks and the lowest level of robustness of the second one of the at least one detected digital watermark from the second plurality of digital watermarks.

9. The method of claim 8 further comprising:
calculating a quality assessment score based at least in part on the lowest level of robustness with respect to the specified first type of potential degradation and the lowest level of robustness with respect to the specified second type of potential degradation, and wherein the generating of the output includes generating the output indicative of at least the perceptual quality of the multimedia content based on the quality assessment score.

10. The method of claim 8 wherein the detecting of the at least one of the plurality of digital watermarks includes making multiple attempts to detect the digital watermarks from the first plurality of digital watermarks in the multimedia content, and no longer making the multiple attempts to detect the digital watermarks from the first plurality of digital watermarks if the first one of the at least one detected digital watermark from the first plurality of digital watermarks having the lowest level of robustness is detected.

11. The method of claim 8 wherein the detecting of the at least one of the plurality of digital watermarks includes making multiple attempts to detect the digital watermarks from the second plurality of digital watermarks in the multimedia content, and no longer making the multiple attempts to detect the digital watermarks from the second plurality of digital watermarks if the second one of the at least one detected digital watermark from the second plurality of digital watermarks having the lowest level of robustness is detected.

12. The method of claim 7 wherein the detecting of the at least one of the plurality of digital watermarks includes attempting to detect each of the first plurality of digital watermarks in the multimedia content, and attempting to detect each of the second plurality of digital watermarks in the multimedia content.

13. The method of claim 1 wherein the detecting of the at least one of the plurality of digital watermarks in the multimedia content includes generating at least one binary-value output indicative of detection of a presence or an absence of the at least one of the plurality of digital watermarks in the multimedia content.

14. The method of claim 1 wherein the detecting of the at least one of the plurality of digital watermarks in the multimedia content includes generating at least one continuous certainty-value output indicative of a likelihood of detection of a presence of the at least one of the plurality of digital watermarks in the multimedia content.

15. The method of claim 14 wherein the generating of the output indicative of at least the perceptual quality of the multimedia content includes generating the output indicative of at least the perceptual quality of the multimedia content based on a specified function of some or all of the at least one continuous certainty-value output.

16. A system for assessing the perceptual quality of multimedia content provided over a communications channel, comprising:
a multimedia content preparer including at least one digital watermark embedder, the at least one digital watermark embedder being operative to incorporate a plurality of digital watermarks in the multimedia content, the plurality of digital watermarks having different levels of robustness with respect to a specified type of degradation in the perceptual quality of the multimedia content introducible during multimedia content transmission; and a multimedia content quality assessor including at least one digital watermark detector and a multimedia quality assessment module, the at least one digital watermark detector being operative to detect at least one of the plurality of digital watermarks in the multimedia content, starting with a least robust digital watermark among the plurality of digital watermarks, and, in the event the least robust digital watermark is not detected, continuing with at least one next least robust digital watermark among the plurality of digital watermarks until the at least one of the plurality of digital watermarks is detected, and the multimedia quality assessment module being operative, in response to the at least one digital watermark detector having detected the at least one of the plurality of digital watermarks in the multimedia content, to generate an output indicative of at least the perceptual quality of the multimedia content based at least in part on the respective level of robustness of the at least one detected digital watermark.

17. The system of claim 16 wherein the detected digital watermark has a lowest level of robustness with respect to the specified type of potential degradation, and wherein the multimedia quality assessment module is further operative to generate the output indicative of at least the perceptual quality of the multimedia content based at least in part on the lowest level of robustness of the at least one detected digital watermark.

18. The system of claim 17 wherein the multimedia quality assessment module is further operative to calculate a quality assessment score based at least in part on the lowest level of robustness with respect to the specified type of potential degradation, and to generate the output indicative of at least the perceptual quality of the multimedia content based on the quality assessment score.

19. The system of claim 17 wherein the at least one digital watermark detector is further operative to make multiple attempts to detect the digital watermarks in the multimedia content, and to no longer make the multiple attempts to detect the digital watermarks if the at least one detected digital watermark having the lowest level of robustness is detected.

20. The system of claim 16 wherein the at least one digital watermark detector is further operative to attempt to detect each of the plurality of digital watermarks in the multimedia content.

21. The system of claim 16 wherein the at least one digital watermark embedder comprises a plurality of digital watermark embedders, one or more of the plurality of digital watermark embedders being operative to incorporate a respective one or more of the plurality of digital watermarks in the multimedia content.

22. The system of claim 16 wherein the multimedia content preparer further includes at least one digital watermark generator operative to generate at least one of the plurality of digital watermarks.

23. The system of claim 22 wherein the at least one digital watermark generator is further operative to generate at least one of the plurality of digital watermarks based at least in part on data from the multimedia content.

24. The system of claim 16 wherein the at least one digital watermark detector is further operative to generate at least one binary-value output indicative of detection of a presence or an absence of the at least one of the plurality of digital watermarks in the multimedia content.

25. The system of claim 16 wherein the at least one digital watermark detector is further operative to generate at least one continuous certainty-value output indicative of a likelihood of detection of a presence of the at least one of the plurality of digital watermarks in the multimedia content.

26. The system of claim 25 wherein the multimedia quality assessment module is further operative to generate the output indicative of at least the perceptual quality of the multimedia content based on a specified function of some or all of the at least one continuous certainty-value output.

* * * * *